US008677006B2

(12) United States Patent
Brenes

(10) Patent No.: US 8,677,006 B2
(45) Date of Patent: Mar. 18, 2014

(54) PROCESSING MEDIA STREAMS

(75) Inventor: Manrique Brenes, Corona del Mar, CA (US)

(73) Assignee: Microsoft Corporation, Redmond, WA (US)

( * ) Notice: Subject to any disclaimer, the term of this patent is extended or adjusted under 35 U.S.C. 154(b) by 279 days.

(21) Appl. No.: 13/101,561

(22) Filed: May 5, 2011

(65) Prior Publication Data

US 2012/0284419 A1 Nov. 8, 2012

(51) Int. Cl.
*G06F 15/16* (2006.01)

(52) U.S. Cl.
USPC ............ 709/231; 370/324; 370/350; 370/503

(58) Field of Classification Search
USPC .................. 709/203, 231, 232, 248; 370/267, 370/395.51; 726/26; 375/240.28
See application file for complete search history.

(56) References Cited

U.S. PATENT DOCUMENTS 6,985,966 B1 * 1/2006 Gupta et al. .................. 709/248
7,460,495 B2 * 12/2008 Li ................................ 370/267
2003/0061371 A1 * 3/2003 Deshpande ................... 709/232
2005/0172340 A1 * 8/2005 Logvinov et al. ............... 726/26
2007/0110074 A1 * 5/2007 Bradley et al. ........... 370/395.51
2008/0152016 A1 * 6/2008 Nagahara et al. ........ 375/240.26
2008/0259966 A1 10/2008 Baird et al.
2010/0023638 A1 * 1/2010 Bowman ....................... 709/231
2010/0083324 A1 4/2010 Smith et al.
2011/0016172 A1 * 1/2011 Shah ............................ 709/203

FOREIGN PATENT DOCUMENTS

EP 1398931 3/2004
EP 1480461 11/2004
EP 2262251 12/2010
WO WO-2009102582 8/2009
WO WO-2012048928 4/2012

OTHER PUBLICATIONS

"International Search Report and Written Opinion", Application No. PCT/EP2012/058224, (Jul. 18, 2012), 13 pages.

* cited by examiner

*Primary Examiner* — Dustin Nguyen
(74) *Attorney, Agent, or Firm* — Sonia Cooper; Jim Ross; Micky Minhas

(57) ABSTRACT

Method and communication system for processing media streams. A plurality of synchronized media streams are provided to a respective plurality of communication clients at a respective plurality of end points of a communication system. The communication clients output the media streams at the end points, wherein the amount of time required for said providing and outputting of the media streams is different for the plurality of end points. At least one of said providing and said outputting of at least one of the media streams is controlled so that the outputting of the plurality of media streams is synchronized at the plurality of end points.

19 Claims, 3 Drawing Sheets

PROCESSING MEDIA STREAMS

FIELD OF THE INVENTION

The present invention relates to processing media streams. In particular the present invention relates to processing media streams at communication clients of a communication system.

BACKGROUND

Media streams may be provided to multiple end points of a communication system. For example, media streams may be broadcast to the multiple end points of the communication system over a network, such as the internet, a telephone network (e.g. the PSTN or a mobile telephone network) or a television network.

The media streams may be output to respective users at the multiple end points in real time, i.e. when they are received at the end points. For example, the media stream may be a TV media stream and the content of the TV media stream may be, for example, a live event such as a sporting event or a music concert. Another example of a media stream which may be output in real time when it is received at the multiple end points, is a gaming media stream, for example where multiple users (or "players") are playing a game over the internet, media streams are output to the players at the different end points to thereby allow them to interact with the game simultaneously, and even interact with other within the game.

SUMMARY

The inventor has realised that in some situations, where media streams are transmitted to multiple end points, the amount of time required to transmit the media streams to the end points and to output the media streams from the end points, is different for the plurality of end points. This can result in synchronised media streams becoming unsynchronised when they are output from the end points. The inventor has further realised that in such situations, the outputting of the media streams at the multiple end points can be controlled such that they are synchronised.

According to a first aspect of the invention there is provided a method of processing media streams in a communication system, the method comprising: providing a plurality of synchronised media streams to a respective plurality of communication clients at a respective plurality of end points of a communication system; the communication clients outputting the media streams at the end points, wherein the amount of time required for said providing and outputting of the media streams is different for the plurality of end points; and controlling at least one of said providing and said outputting of at least one of the media streams so that the outputting of the plurality of media streams is synchronised at the plurality of end points.

In this way, outputting of the plurality of media streams is synchronised at the plurality of end points. This means that the media streams may be output at the same time at the plurality of end points, irrespective of the amount of time required to provide the media streams to the end points and output the media streams from the end points. This may be advantageous for a number of reasons as described herein. The media streams are "synchronised media streams" in the sense that it may be beneficial for the media streams to be output in a synchronised manner. The synchronised media streams may be the same as each other, for example where the synchronised media streams are TV media streams for streaming TV media to the plurality of end points. However, the synchronised media streams are not necessarily the same as each other, for example where the synchronised media streams are gaming media streams to be provided to a plurality of players of a game, the media streams may be different for each user, but they may still be considered "synchronised" in the sense that they should be output to the users in a synchronised manner. The "amount of time required" to provide and output the media streams from the end points is the amount of time that these processes would take if they were performed separately for each media stream. However, the method described above takes account of the required time for each media stream and then controls the processing of each media stream such that the media streams are output synchronously. This may mean that the media streams are all output after an amount of time equal to the longest of the required times for providing and outputting the media streams at the various end points. In this way the method provides global control of the media streams being output across the plurality of end points of the communication system.

Preferred embodiments relate to controlling the output of media streams, such as streamed 'on demand' video, or stored video, at two or more end points such that the output of the media streams is synchronised at the end points. For example, where the media streams are TV media streams, the media streams may be controlled such that users in two locations (at two end points) can watch the same TV media at exactly the same time. Synchronising media streams in this way may be particularly advantageous when a communication event also exists between the two users at the same time that the media streams are being output to the users at the end points. Synchronisation of two TV media streams can ensure that a first user does not hear a second user's reaction (in a simultaneous communication event) to an event in the TV media stream that has not yet been observed by the first user—e.g. the second user's reaction to a goal being scored where the content of the TV media stream is a football match.

As described above, the media streams may be gaming media streams. In this way, some embodiments allow for synchronization and/or compensation of response times for gaming. For example, if two players are playing over the Internet, the player with the lowest delay when communicating over the Internet with a server managing the game between the two players has an advantage. The latency of communication between each end point at the server may be regularly monitored and the response times of the player with an advantage (i.e. the player having a shorter latency) may be delayed to compensate for the advantage and to match the latency of the second player. This makes the game more dependent on each player's skill rather than the response time of the communication between their end point and the server managing the game.

The communication clients may engage in a communication event with each other over the communication system at the same time as said providing and outputting of the media streams at the plurality of end points. The method may further comprise: when a user of a first one of the plurality of end points supplies a user input of the communication event to the communication client of said first one of the plurality of end points, determining a media element of the media stream currently being output at said first one of the plurality of end points; transmitting an indication of the determined media element from said first one of the plurality of end points as part of said communication event to a second one of the plurality of end points; and controlling the output of the communication event at the second one of the plurality of end points such that said user input is output later than the determined media element indicated by said indication at the second one of the plurality of end points.

The step of providing a plurality of synchronised media streams may comprise transmitting at least one of the plurality of synchronised media streams to a respective at least one of the plurality of end points over the communication system. The step of providing a plurality of synchronised media streams may comprise transmitting the plurality of synchronised media streams to the plurality of end points over the communication system from a server of the communication system. Alternatively, the step of providing a plurality of synchronised media streams may comprise transmitting said at least one of the plurality of synchronised media streams to a respective at least one of the plurality of end points over the communication system from another one of the plurality of end points.

The method may further comprise: including synchronisation information in the media streams; and buffering the media streams at the plurality of end points, wherein the communication clients output the media streams at the end points in accordance with the synchronisation information in the media streams.

The synchronisation information included in one of the media streams may comprise a time stamp which is included in the header of a frame of that media stream wherein the corresponding communication client may outputs the frame of that media stream at the corresponding end point at a time indicated by the time stamp. The method may further comprise inserting a frame identifier into the one of the media streams, by a source of the media streams, to thereby associate the time stamp with said frame. The method may further comprise generating an identifier using data in the frame to thereby associate the time stamp with said frame.

The method may further comprise monitoring the amount of time required for said providing and outputting of the media streams at the plurality of end points, wherein said controlling at least one of said providing and said outputting of at least one of the media streams comprises adding delay to at least one of said providing and said outputting of at least one of the media streams so that the outputting of the plurality of media streams is synchronised at the plurality of end points.

The monitoring step may be performed by the respective communication clients and the method may further comprise transmitting information relating to the monitored amounts of time between the communication clients over the communication system, wherein at least one of said clients adds the delay to at least one of said providing and said outputting of at least one of the media streams so that the outputting of the plurality of media streams is synchronised at the plurality of end points.

The monitoring step may be performed by a server of the communication system.

The step of controlling at least one of said providing and said outputting of at least one of the media streams may be based at least in part on a media control input received from a user at one of the plurality of end points.

Each media stream may be one of a video stream, an audio stream, and a multimedia stream. Each media stream may be one of a TV media stream and a gaming media stream.

According to a second aspect of the invention there is provided a communication system for processing media streams, the communication system comprising: a plurality of end points comprising a respective plurality of communication clients configured to output a respective plurality of media streams which are provided to the communication clients, wherein the amount of time required to provide and output the media streams is different for the plurality of end points; and a controller configured to control at least one of said providing and said outputting of at least one of the media streams so that the outputting of the plurality of media streams is synchronised at the plurality of end points.

The communication clients may be further configured to engage in a communication event with each other over the communication system at the same time as said providing and outputting of the media streams at the plurality of end points.

The communication system may further comprise a server which comprises said controller.

According to a third aspect of the invention there is provided a plurality of computer program products embodied on a respective plurality of non-transient, computer-readable media and comprising code configured so as when executed on a respective plurality of end points of a communication system to perform the operations in accordance with the methods described herein.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

Preferred embodiments of the invention will now be described by way of example only.

Figure 1:
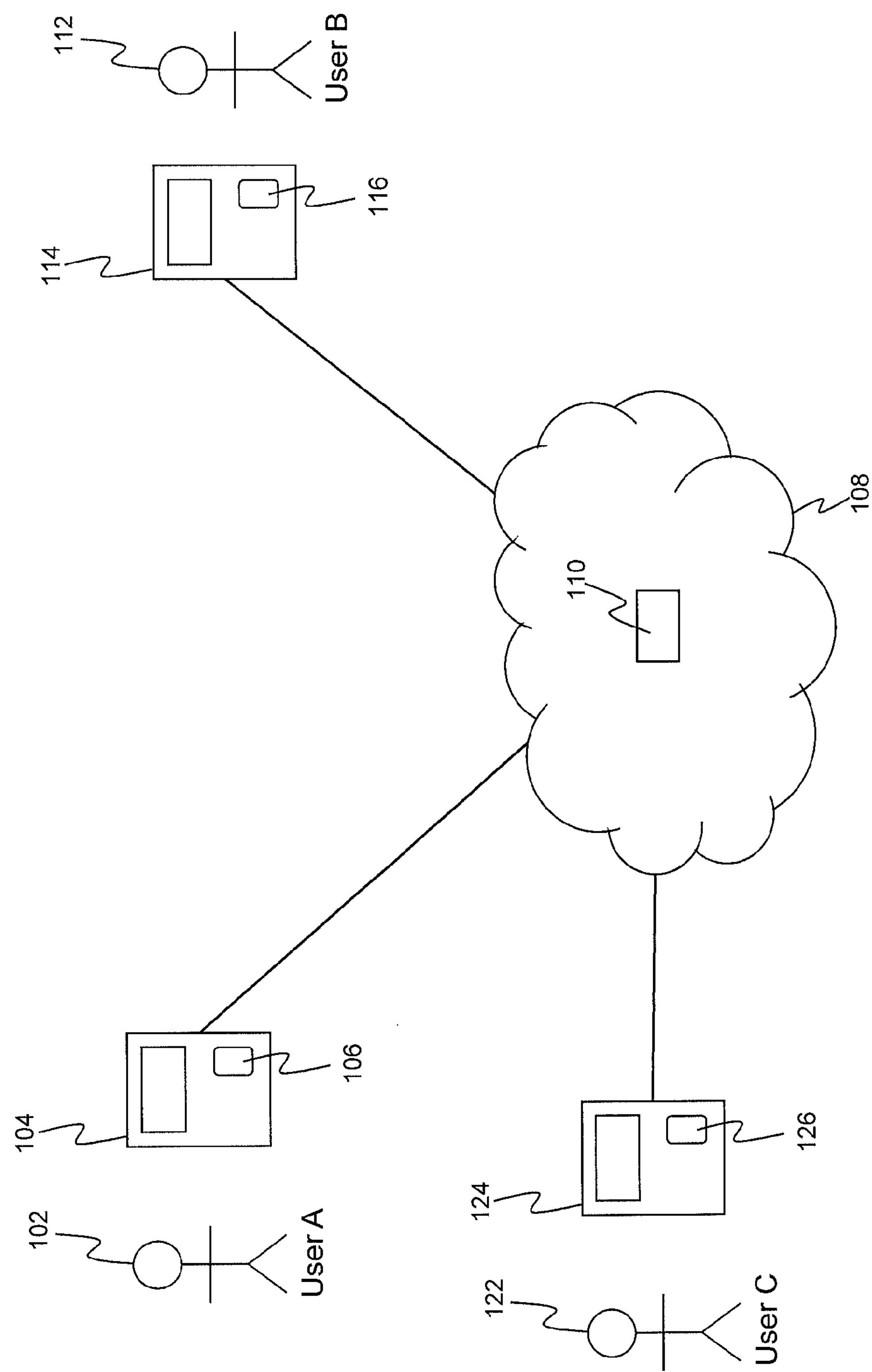
FIG. 1 shows a communication system according to a preferred embodiment.

FIG. 1 shows a communication system comprising a first user ("User A") 102 who has an associated first user terminal 104, a second user ("User B") 112 who has an associated second user terminal 114 and a third user ("User C") 122 who has an associated third user terminal 124. In other embodiments the communication system may comprise any number of users and associated user terminals. The user terminals 104, 114 and 124 can communicate over the network 108 in the communication system, thereby allowing the users 102, 112 and 122 to communicate with each other over the network 108. In the preferred embodiment the communication system is a packet-based, P2P communication system, but other types of communication system could also be used, such as non-P2P, VoIP or IM systems. The network 108 may, for example, be the Internet, a telephone network (such as the PSTN or a mobile telephone network) or a television network. The user terminal 104 may be, for example, a mobile phone, a personal digital assistant ("PDA"), a personal computer ("PC") (including, for example, Windows™, Mac OS™ and Linux™ PCs), a gaming device or other embedded device able to connect to the network 108. The user terminal 104 is arranged to receive information from and output information to the user 102 of the user terminal 104. In a preferred embodiment of the invention the user terminal 104 comprises a display such as a screen and an input device such as a keyboard, mouse, touch-screen, keypad and/or joystick. The user terminal 104 is connected to the network 108.

The user terminal 104 executes a communication client 106, provided by a software provider associated with the communication system. The communication client 106 is a software program executed on a local processor in the user terminal 104. The client 106 performs the processing required at the user terminal 104 in order for the user terminal 104 to transmit and receive data over the communication system. As is known in the art, the client 106 may be authenticated to communicate over the communication system through the presentation of digital certificates (e.g. to prove that User A 102 is a genuine subscriber of the communication system—described in more detail in WO 2005/009019).

The user terminals 114 and 124 correspond to the user terminal 104. The user terminal 114 executes, on a local processor, a communication client 116 which corresponds to the communication client 106. The client 116 performs the processing required to allow the user 112 to communicate over the network 108 in the same way that the client 106 performs the processing required to allow the user 102 to communicate over the network 108. The user terminal 124 executes, on a local processor, a communication client 126 which corresponds to the communication client 106. The client 126 performs the processing required to allow the user 122 to communicate over the network 108 in the same way that the client 106 performs the processing required to allow the user 102 to communicate over the network 108. The user terminals 104, 114 and 124 are end points in the communication system. FIG. 1 shows only three users (102, 112 and 122) for clarity, but many more users may be connected to the communication system, and may communicate over the communication system using respective communication clients executed on respective end points of the communication system, as is known in the art. The communication system includes a server 110 on the network 108.

Figure 2:
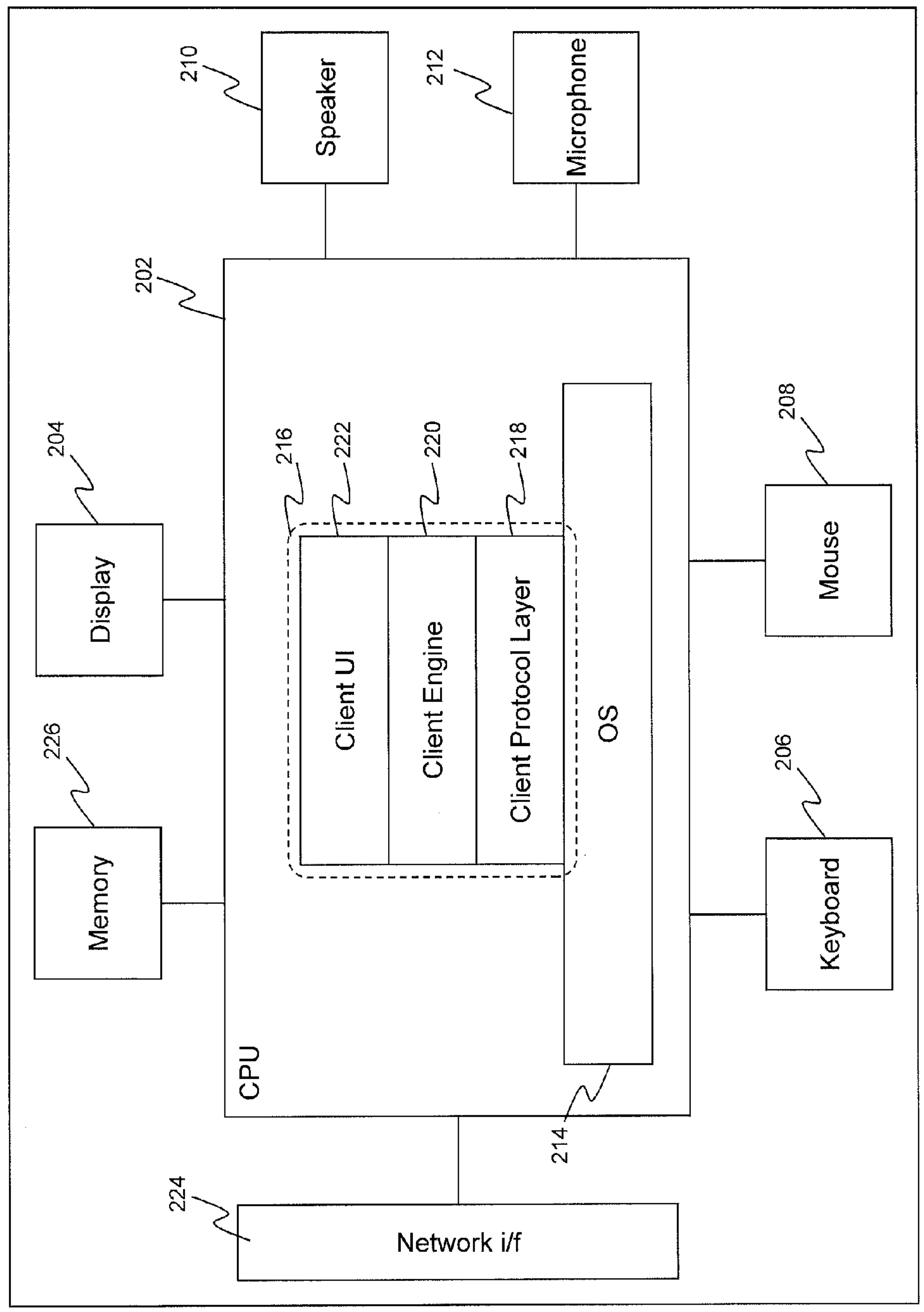
FIG. 2 shows a block diagram of a user terminal according to a preferred embodiment.

FIG. 2 illustrates a detailed view of the user terminal 104 on which is executed client 106. The user terminal 104 comprises a central processing unit ("CPU") 202, to which is connected a display 204 such as a screen, input devices such as a keyboard (or a keypad) 206 and a pointing device such as a mouse 208. The display 204 may comprise a touch screen for inputting data to the CPU 202. An output audio device 210 (e.g. a speaker) and an input audio device 212 (e.g. a microphone) are connected to the CPU 202. The display 204, keyboard 206, mouse 208, output audio device 210 and input audio device 212 are integrated into the user terminal 104. In alternative user terminals one or more of the display 204, the keyboard 206, the mouse 208, the output audio device 210 and the input audio device 212 may not be integrated into the user terminal 104 and may be connected to the CPU 202 via respective interfaces. One example of such an interface is a USB interface. The CPU 202 is connected to a network interface 224 such as a modem for communication with the network 108. The network interface 224 may be integrated into the user terminal 104 as shown in FIG. 2. In alternative user terminals the network interface 224 is not integrated into the user terminal 104. The user terminal 104 also comprises a memory 226 for storing data as is known in the art.

FIG. 2 also illustrates an operating system ("OS") 214 executed on the CPU 202. Running on top of the OS 214 is a software stack 216 for the client 106. The software stack shows a client protocol layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network via the network interface 224. The client protocol layer 218 of the client software communicates with the operating system 214 and manages the connections over the communication system. Processes requiring higher level processing are passed to the client engine layer 220. The client engine 220 also communicates with the client user interface layer 222. The client engine 220 may be arranged to control the client user interface layer 222 to present information to the user 102 via the user interface of the client and to receive information from the user 102 via the user interface.

The user terminals 114 and 124 are implemented in the same way as user terminal 104 as described above, wherein the user terminals 114 and 124 may have corresponding elements to those described herein in relation to user terminal 104.

Figure 3:
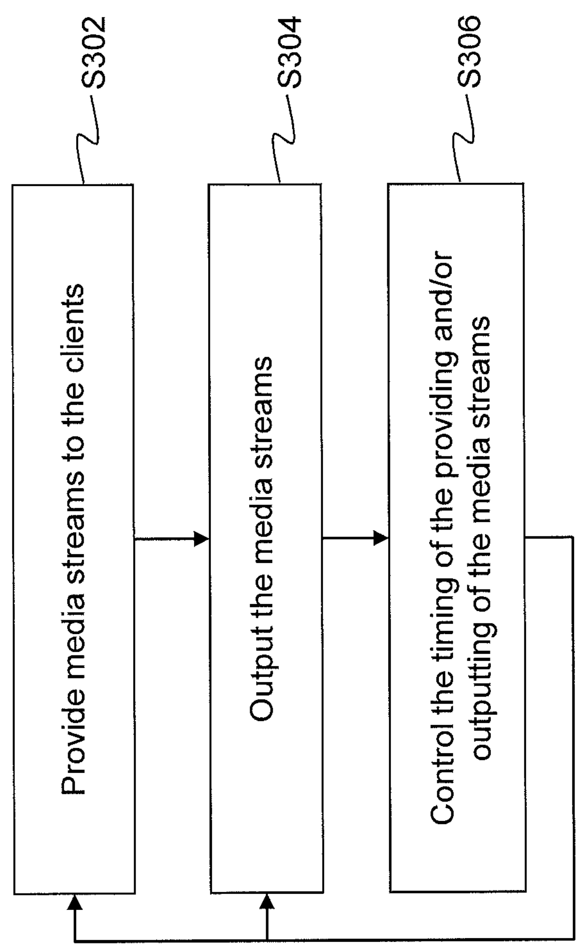
FIG. 3 is a flow chart for a process of processing media streams according to a preferred embodiment.

With reference to FIG. 3 there is now described a method of processing media streams according to a preferred embodiment.

In step S302 a respective plurality of media streams are provided to the plurality of clients (106, 116 and 126). For example, the media streams may be transmitted from the server 110 to the clients 106, 116 and 126 over the network 108. Alternatively, the source of the media streams may be one of the end points, e.g. end point 104. The media streams may be stored in the memory 226 of the end point 104 and may be provided to the client 106 in the end point 104, and transmitted to the clients 116 and 126 over the network 108.

In step S304 the clients 106, 116 and 126 output the media streams at the respective end points 104, 114 and 124. In this way the media streams are output to the users 102, 112 and 122. Outputting the media streams may involve decoding the media streams if the media streams were previously encoded.

Step S306 represents the controlling of the timing of the providing and/or outputting steps S302 and S304. The providing of the media streams to the clients 106, 116 and 126 in step S302 and the outputting of the media streams to the users 102, 112 and 122 in step S304 are controlled such that the media streams are output synchronously at the end points 104, 114 and 124. There are described below various embodiments in which the controlling of step S306 may be performed.

In one embodiment, the client 106 receives a media stream and determines an indication of the time at which a media element of the media stream is output to the user 102 of the end point 104. Similarly, the client 116 receives a synchronous media stream and determines an indication of the time at which a corresponding media element of the synchronous media stream is output to the user 112 of the end point 114. Two approaches which may be used to implement this are described below.

A first approach involves adding a time stamp to the header on each or some of the video frames (many protocols for processing video signals already have this ability) and buffering the video signal at the end points. The video signal is buffered for an amount of time such that the particular frames with the time stamps are output at times indicated by the time stamps. In other words, the video signal is buffered to match the delivery of a given frame to a given time stamp. This approach relies on a way to match the frames to particular time stamps, which can be done in multiple ways. A simple way is to have the video source insert a specific frame identifier into the time stamp such that the time stamp can specifically identify a frame to which it is matched. Alternatively, information in a given frame may be used to generate a number that could be used as an identifier of the frame. The number is preferably large enough such that the number can be used as a temporary unique identifier of the frame. The number can then be included in the time stamp such that the time stamp can identify the frame to which it is matched.

A second approach involves monitoring the latency at each end point relative to the source of the synchronised media streams and adjusting for the respective latencies. This approach may be simpler than the first approach but may be less elegant and less rigorous in synchronising the output of the media streams. The monitoring of the latency at each end point is used to determine the output delay that needs to be applied to a media stream output from at least one of the end points to ensure that the media streams are synchronised across all of the end points.

A delay to be applied to the media stream at each end point may be calculated at the clients. For example the client 106 could identify that a data element (e.g. a data element from packet number X in the media stream) is ready to be output from the end point 104 to the user 102 at time T. This information may be transmitted to (i.e. exchanged with) the client 116. The client 116 may determine that the corresponding data element from packet number X has not yet been received at the end point 114, or will not be available to output from the end point 114 until a time T+t seconds. In response to determining the output lag at the client 116, the client 116 may transmit a request to the client 106 over the network 108 to request that the output of media at the first client is delayed by t seconds. In this way the output of the data element of the media streams are synchronised at the end points 104 and 114.

The data of the media streams provided to the end points 104, 114 and 124 may include synchronisation information. This synchronisation information may be used by each client 106, 116 and 126 to identify the corresponding media elements (or "media segments"), rather than analysing synchronisation at a packet level. In this way the clients 106, 116 and 126 can identify different data elements of the media streams that should be output in a synchronised manner from the end points 104, 114 and 124.

In another embodiment, a lag time could be determined for each end point (104, 114 and 124) at the server 110 based on information provided to the server 110 from the clients (106, 116 and 126). This is particularly advantageous in the case where the server 110 is the source of the media streams provided to the clients (106, 116 and 126). For example, where the media streams are streamed from the server 110 to the clients (106, 116 and 126), the server 110 may apply respective delays to the media streams in order to synchronise the output of the media streams at the end points (104, 114 and 124). For example, if the lag time for transmitting the media stream to, and outputting the media stream from, end point 114 is longer than the corresponding lag time for end point 104 then the server will apply a larger delay to the media stream before transmission to end point 104 than it will apply to the media stream before transmission to end point 114. In this way the output of the media streams at the end points 104 and 114 may be synchronised.

The lag at each end point (104, 114 and 124) may be determined by analysing a media control instruction input from the corresponding user (102, 112 and 122). Examples of media control instructions which a user may input are play, pause and fast forward. In this way the users can, to some extent at least, control the lag applied to the media stream provided from their respective end points.

A communication event may exist between the clients of the end points over the network at the same time as the synchronised media streams are being output at the end points. The communication event may be an audio call or a video call for example. The communication event and the outputting of the media streams may occur simultaneously. In this case, it is particularly advantageous to synchronise the output of the media streams at the end points. In this way the users (e.g. 102 and 112) in a call will view the media stream synchronously at the end points 104 and 114 during their call. This means that the users 102 and 112 will react at the same times to the media streams, which can be beneficial. For example, if the media streams are showing a football match both users will view a goal being scored at the same time.

In some embodiments, during the communication event, the user 102 provides some user input (e.g. speech input) to the client 106. When the user input is received at the client 106, the client 106 determines a media element of the media stream that is currently being output from the end point 104. That media element corresponds with the user input received from the user 102. Information which relates the user input to the corresponding media element is transmitted as side information with the content of the communication event to the client 116, for example, as side information to an encoded audio signal of a call. The end terminal 114 receiving the side information can ensure that the output of the communication stream is controlled to occur at least later than the corresponding media element in the media stream. This is useful in ensuring that when two users are engaging in a communication event while watching synchronised media streams, one user will not hear the other user's reaction to an event in the media stream before the media stream is output at his end point.

The method steps described above may be implemented at the end points in software or in hardware. As an example, computer program products (e.g. the clients described above) may be embodied on the end points and executed by the CPUs of the end points in order to carry out the methods described above.

The embodiments described above relate to a P2P communication system, but embodiments may be implemented which use any other type of communication system, as would be apparent to a person skilled in the art.

Furthermore, while this invention has been particularly shown and described with reference to preferred embodiments, it will be understood to those skilled in the art that various changes in form and detail may be made without departing from the scope of the invention as defined by the appendant claims.

The invention claimed is:

1. A method comprising:

providing a plurality of synchronised media streams to a respective plurality of communication clients at a respective plurality of end points of a communication system effective to cause the communication clients to output the media streams at the end points, an amount of time required between said providing and said outputting of the media streams being different for the plurality of end points, the communication clients engaged in a communication event with each other over the communication system at a same time as said providing the synchronized media streams; and controlling at least one of said providing and said outputting of at least one of the media streams so that the outputting of the plurality of media streams is synchronised at the plurality of end points;

wherein, when a user input of the communication event is received at the communication client of a first one of the plurality of end points:

a media element of the media stream currently being output at said first one of the plurality of end points is determined, an indication of the determined media element is transmitted from said first one of the plurality of end points as part of said communication event to a second one of the plurality of end points, and the output of the communication event at the second one of the plurality of end points is controlled such that said user input is output later than the determined media element indicated by said indication at the second one of the plurality of end points.

2. The method of claim 1 wherein said providing a plurality of synchronized media streams comprises transmitting at least one of the plurality of synchronised media streams to a respective at least one of the plurality of end points over the communication system.

3. The method of claim 2 wherein said providing a plurality of synchronized media streams comprises transmitting the plurality of synchronised media streams to the plurality of end points over the communication system from a server of the communication system.

4. The method of claim 2 wherein said providing a plurality of synchronized media streams comprises transmitting said at least one of the plurality of synchronised media streams to a respective at least one of the plurality of end points over the communication system from another one of the plurality of end points.

5. The method of claim 1 further comprising:

including synchronisation information in the media streams; and buffering the media streams at the plurality of end points, wherein the communication clients output the media streams at the end points in accordance with the synchronisation information in the media streams.

6. The method of claim 5 wherein the synchronisation information included in one of the media streams comprises a time stamp which is included in the header of a frame of that media stream wherein the corresponding communication client outputs the frame of that media stream at the corresponding end point at a time indicated by the time stamp.

7. The method of claim 6 further comprising inserting a frame identifier into the one of the media streams, by a source of the media streams, to thereby associate the time stamp with said frame.

8. The method of claim 6 further comprising generating an identifier using data in the frame to thereby associate the time stamp with said frame.

9. The method of claim 1 further comprising monitoring the amount of time required for said providing and outputting of the media streams at the plurality of end points, wherein said controlling at least one of said providing and said outputting of at least one of the media streams comprises adding delay to at least one of said providing and said outputting of at least one of the media streams so that the outputting of the plurality of media streams is synchronised at the plurality of end points.

10. The method of claim 9 wherein said monitoring is performed by the respective communication clients and the method further comprises transmitting information relating to the monitored amounts of time between the communication clients over the communication system, wherein at least one of said clients adds the delay to at least one of said providing and said outputting of at least one of the media streams so that the outputting of the plurality of media streams is synchronised at the plurality of end points.

11. The method of claim 9 wherein said monitoring is performed by a server of the communication system.

12. The method of claim 1 wherein said controlling at least one of said providing and said outputting of at least one of the media streams is based at least in part on a media control input received from a user at one of the plurality of end points.

13. The method of claim 1 wherein the media streams are one of a video stream, an audio stream, and a multimedia stream.

14. The method of claim 1 wherein the media streams are one of a TV media stream and a gaming media stream.

15. A method comprising:

receiving, at a first communication client at a first computing device of a communication system, a synchronized media stream;

controlling the synchronized media stream to be output at the first computing device at a same time as the synchronized media stream is output at a second computing device of the communication system;

engaging, by the first communication client, in a communication event with a second communication client at the second computing device over the communication system at a same time as the synchronized media stream is output at the first computing device;

receiving, at the first communication client, a user input of the communication event;

determining a media element of the synchronized media stream currently being output when the user input is received; and transmitting an indication of the determined media element, as part of the communication event, to the second computing device effective to cause the user input to be output after the determined media element is output at the second computing device.

16. The method of claim 15, wherein the communication event comprises an audio call.

17. The method of claim 15, wherein the communication event comprises a video call.

18. The method of claim 15, wherein the user input comprises speech input.

19. A method comprising:

receiving, at a communication client at a computing device of a communication system, a synchronized media stream;

controlling the synchronized media stream to be output at the computing device at a same time as the synchronized media stream is output at an additional computing device of the communication system;

engaging, by the communication client, in a communication event with an additional communication client at the additional computing device;

receiving, at the computing device, an indication of a media element of the synchronized media stream that was output at a same time as a user input of the communication event was received at the additional computing device;

controlling the user input of the communication event to be output at the computing device after the determined media element of the synchronized media stream is output at the computing device.

* * * * *

UNITED STATES PATENT AND TRADEMARK OFFICE

CERTIFICATE OF CORRECTION

PATENT NO. : 8,677,006 B2
APPLICATION NO. : 13/101561
DATED : March 18, 2014
INVENTOR(S) : Manrique Brenes It is certified that error appears in the above-identified patent and that said Letters Patent is hereby corrected as shown below:

At item 73 on the patent title page, please correct the Assignee from “Microsoft Corporation, Redmond, WA (US)” to “Skype, Dublin, (IE)”

Signed and Sealed this
Ninth Day of December, 2014

Michelle K. Lee

Michelle K. Lee
*Deputy Director of the United States Patent and Trademark Office*